(12) United States Patent
Abdellatif (10) Patent No.: US 6,624,847 B1
(45) Date of Patent: Sep. 23, 2003

(54) IMAGING SYSTEM (75) Inventor: Mohamed Abolella Abdellatif, Osaka (JP)

(73) Assignee: Nature Technology Co., Ltd., Osaka (JP)

(*) Notice: Subject to any disclaimer, the term of this patent is extended or adjusted under 35 U.S.C. 154(b) by 0 days.

(21) Appl. No.: 09/319,920

(22) PCT Filed: Dec. 17, 1996

(86) PCT No.: PCT/JP96/03683
§ 371 (c)(1),
(2), (4) Date: Jun. 17, 1999

(87) PCT Pub. No.: WO98/27744
PCT Pub. Date: Jun. 25, 1998

(51) Int. Cl.[7] .......................... H04N 9/73; H04N 5/225; G02B 21/00; G02B 17/00
(52) U.S. Cl. ................. 348/223.1; 348/337; 348/335; 359/365; 359/728
(58) Field of Search .............................. 348/223.1, 337, 348/340, 339, 335, 143; 359/364, 365, 366, 728

(56) References Cited

U.S. PATENT DOCUMENTS

| | | | | |
|---|---|---|---|---|
| 4,043,672 A | * | 8/1977 | Baumgartner | 348/143 |
| 4,933,751 A | * | 6/1990 | Shinonaga et al. | 348/337 |
| 5,790,181 A | * | 8/1998 | Chahl et al. | 348/143 |

FOREIGN PATENT DOCUMENTS

| | | | | |
|---|---|---|---|---|
| JP | 3-254727 | | 11/1991 | |
| JP | 03-254727 | * | 11/1991 | H04N/9/04 |
| JP | 3-286398 | | 12/1991 | |
| JP | 5-122708 | | 5/1993 | |
| JP | 8-82831 | | 3/1996 | |
| JP | 08-082831 | * | 3/1996 | H04N/5/225 |

OTHER PUBLICATIONS

Abidellatif, O., et al., "Measurement of True Object Colors by Using the Reflection of a Sub–Surface," Robotics Mechatronics Kouenkai: 1996 Kouen Ronbun Shu, vol. A, No. 96–2, pp. 682–685 (Jun. 1996).

* cited by examiner

Primary Examiner—Wendy R. Garber
Assistant Examiner—Lin Ye
(74) Attorney, Agent, or Firm—Rader, Fishman & Grauer PLLC (57) ABSTRACT

The present invention is directed to an imaging system which corrects colors of taken images of objects at practical speed and displays the image colors correctly. The imaging system comprises an imaging device (23) for taking a color image and a lens (21), and a reflection surface (18) is provided within the maximum field of view (Vm, Vm) to diffuse-reflect an image of an object (Ob) so that it impinges upon the imaging device (23) through the lens (21). Each main coordinates (Xmi, Ymi) of a direct image obtained as an object point (P) on the object (Ob) is imaged on the imaging device (23) is assigned to corresponding sub-coordinates (Xni, Yni) of an indirect image of the object point (P) formed from the reflection surface (18) on the imaging device (23). The R, G, B components in pixels at the individual main coordinates are respectively divided by the same components at the corresponding sub-coordinates to provide a color-corrected image.

14 Claims, 9 Drawing Sheets

IMAGING SYSTEM

TECHNICAL FIELD

The present invention relates to an imaging system capable of correcting colors of a captured image of an object to correctly display the colors of the image.

BACKGROUND ART

Colors of objects are susceptible to illumination conditions, and it is therefore difficult to always display correct colors of images captured by a camera. Human eyes can correctly recognize actual colors of objects regardless of such conditions, which ability is known as color constancy.

Existing video cameras do not comprise imaging devices having this feature. Attempts are being made to implement the color constancy in imaging systems having such video cameras by performing complicated correction, e.g., by comparing color of a particular point with the surrounding color to make correction. However, these attempts are not practical, since they are limited to correction to special images or the image processing takes a long time.

An object of the present invention is to provide an imaging system with good response which can correct colors of taken images of objects at practical speed to correctly display the colors of the images.

DISCLOSURE OF THE INVENTION

The present invention is directed to an imaging system comprising an imaging device for taking a color image and a lens for forming an image of an object on said imaging device, The imaging system comprising a reflection surface, provided within a maximum field of view formed by said lens and said imaging device, for diffuse-reflecting the image of said object to cause the image to impinge upon said imaging device through said lens, assigning means for assigning each main coordinates (Xmi, Ymi) in a direct image obtained as an object point on said object is imaged on said imaging device to corresponding sub-coordinates (Xni, Yni) in an indirect image of said object point obtained from said reflection surface on said imaging device, and a color-correcting portion for obtaining a color-corrected image on the basis of the following expressions.

$$D1\ (Xmi, Ymi) = (Rmi/Rni) \cdot S,$$

$$D2\ (Xmi, Ymi) = (Gmi/Gni) \cdot S,$$

and $$D3\ (Xmi, Ymi) = (Bmi/Bni) \cdot S.$$

Where D1, D2, and D3 respectively represent R, G, B components of the corrected color image at said main coordinates (Xmi, Ymi), Rmi, Gmi, and Bmi respectively represent R, G, B components in a direct image pixel (Pm) at said main coordinates (Xmi, Ymi), Rni, Gni, and Bni respectively represent R, G, B components in an indirect image pixel (Pn) at said sub-coordinates (Xni, Yni), and S represents a correction term.

The analysis by the inventor described later, revealed that a diffuse-reflected indirect image at the reflection surface provided within the maximum field of view, represents the brightness at the object point. Accordingly, dividing Rmi, Gmi, and Bmi respectively by Rni, Gni, and Bni representing the brightness eliminates errors due to effects of illumination. This was confirmed by experiments carried out by the inventor. The correction term S prevents the output resulting from the division of Rmi, Gmi, Bmi by Rni, Gni, Bni from exceeding the limit of device scale width and becoming saturated.

Particularly, setting said reflection surface so that a direct image section for forming said direct image in said imaging device has a larger width than an indirect image section for forming said indirect image enables effective use of the maximum field of view of the imaging device. Moreover, as will be described later, it was confirmed that the color correction encounters no problem even when the width of the indirect image section is about 25% of the maximum field of view.

It is preferred that the imaging system comprises a cover provided on the side on which light comes into said lens, for intercepting light from outside of said maximum field of view at least. While light outside the maximum field of view causes errors in color correction, the cover reduces the errors.

When designing the reflection surface, the direct image and the indirect image of said object may be similar figures with respect to the direction in which said direct image section and said indirect image section are arranged. In this case, it is possible to corrected color small objects like flowers more precisely to the details.

The reflection surface may be so designed that the ratio of the numbers of corresponding pixels between the indirect image section for forming said indirect image and the direct image section for forming said direct image in the direction in which said direct image section and said indirect image section are arranged is constant. In this case, the algorithm for color correction can be simplified and the color correction can be achieved at very high speed.

The reflection surface can be shaped according to the following equation.

$$Xni = f(A - \tan(2\alpha))/(1 + A \cdot \tan(2\alpha))$$

Where f represents focal length of the lens, A represents (X/Z), X represents horizontal-direction distance of the object point P from a horizontal-reference line Ch, Z represents vertical distance of the object point P from a vertical-reference line Cv, and $\alpha$ represents an angle formed between the reflection surface and a horizontal line parallel to the vertical-reference line Cv.

Experiments made by the inventor showed that forming said reflection surface with leather having oil coating on its surface allows the color correction to be achieved very well.

The present invention can be implemented by installing software for realizing the assigning means stored in a storage medium into a common personal computer and attaching the cover having the reflection surface to a common video camera.

As stated above, the features of the present invention provides an imaging system with good response which can correct colors of a taken image of an object at practical speed by comparing an indirect image from the reflection surface and a direct image so as to correctly display the colors of the object.

The present invention will become more apparent from the following detailed description of the embodiments and examples of the present invention. The reference characters in claims are attached just for convenience to clearly show correspondence with the drawings, which are not intended to limit the present invention to the configurations shown in the accompanying drawings.

BRIEF DESCRIPTION OF THE DRAWINGS

FIG. 3 shows the relation between a direct image Im and an indirect image In on the total image plane F; (a) in a nonlinear mapping, (b) in a linear mapping, and (c) with spot light illumination.

FIG. 4 shows assignment between direct image pixel groups Pm and indirect image pixels Pn; (a) in the nonlinear mapping, and (b) in the linear mapping.

BEST MODE FOR CARRYING OUT THE INVENTION

First, the principle of the present invention will be described referring to FIGS. 1 to 5.

Figure 1:
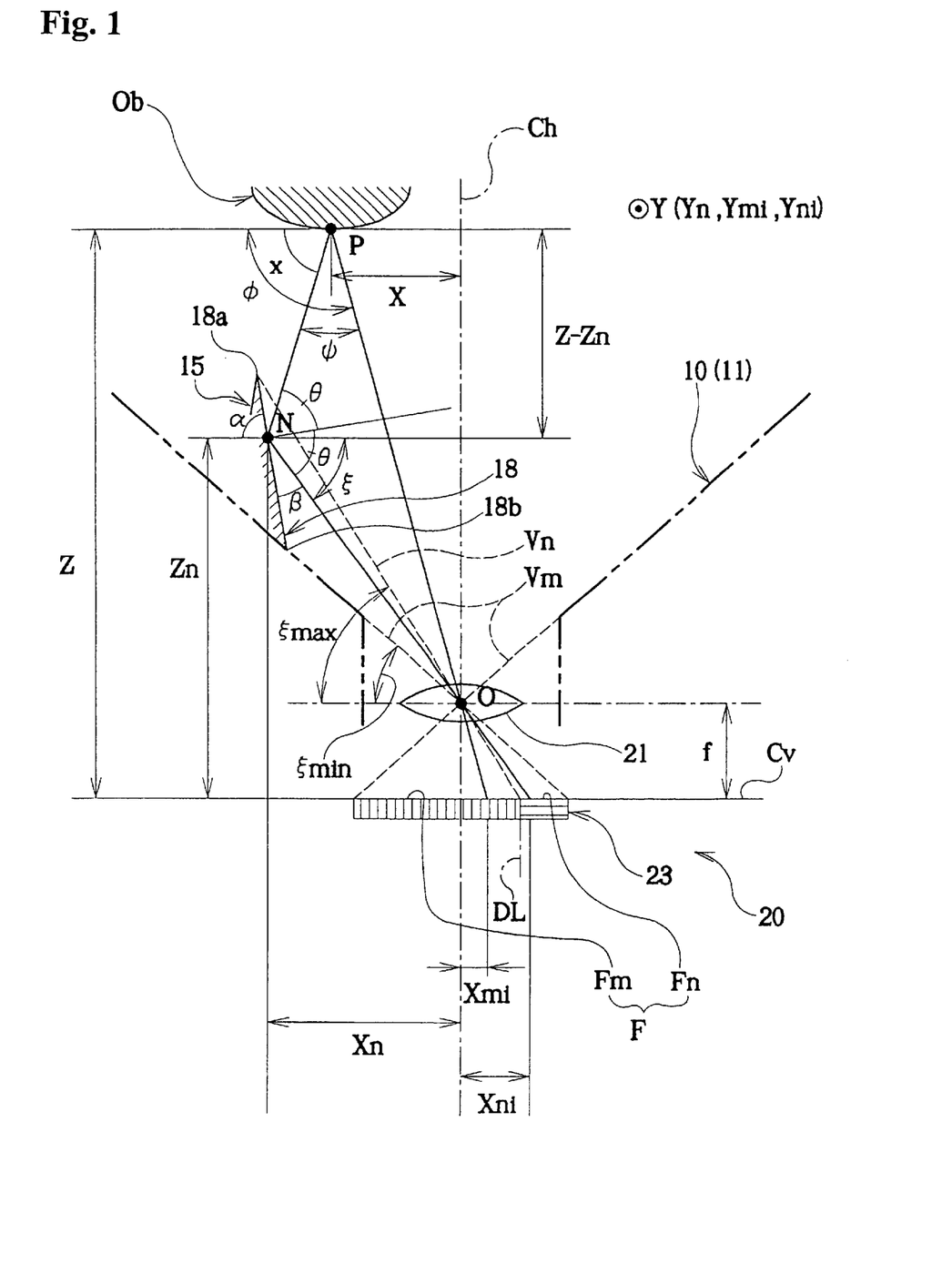
FIG. 1 is an explanation diagram showing the relation among an object Ob, reflection surface, lens, and CCD device for explaining the principle of the present invention.

The example of FIG. 1 shows a simplified geometric model of optical paths. Now we consider the positional relation between an object point P on a general object Ob and a reflection reference point N, or a particular point on a reflection surface (nose surface) 18. The object point P on the object Ob is focused as direct a image on a direct image section Fm of a CCD device 23 through "O" in the len 21 of the camera 20. The image of the object point P on the object Ob is also diffuse-reflected at the reflection surface 18 of the reflector 15 and passes through the lens 21 to impinge upon an indirect image portion Fn of the CCD device 23 to form an indirect image Image. While the indirect image section Fn is not focused because the diffuse reflection at the reflection surface 18 and the reflection surface 18 are out of the focus of the lens 21, it is assumed here for simplicity that the reflection surface 18 causes mirror reflection, and the centers of the optical paths are shown as segments PN and NO for convenience.

The range surrounded by a pair of maximum field lines (planes) Vm, Vm on the total image plane F of the CCD device 23 is the range in which the lens 21 can form an image on the CCD device 23, which corresponds to the maximum field of view. Needless to say, the maximum field of view extends in the direction perpendicular to the paper of FIG. 1. In the total image plane F corresponding to this range, the regional indirect image section Fn surrounded by the maximum field line Vm extending from upper left to lower right and the boundary field line Vn connecting the reflection surface top 18a of the reflection surface 18 and the "O" in the lens 21 is the range in which the indirect image is formed. The remaining regional direct image section Fm is the range in which the direct image is formed.

The horizontal-reference line Cv in FIG. 1 is a reference axis passing through the center of the lens 21 to show the zero point with respect to the horizontal direction and the direction of the thickness of the paper, and the vertical-reference line Cv passing through the imaging plane of the CCD device 23 is a reference axis showing the reference point with respect to the vertical direction. The image coordinates are represented by (X, Y, Z) system coordinates. The characters X, Xn, Xmi, and Xni in the drawing show the horizontal distances between the horizontal-reference line Ch and the object point P, reflection reference point N, direct image Im of the object point P on the direct image section Fm, and indirect image In of the object point P on the indirect image section Fn, respectively. Similarly, the horizontal distances between these points and the horizontal-reference line Ch in the direction perpendicular to the paper of FIG. 1 are shown by the characters Y, Yn, Ymi and Yni. The characters Z and Zn in the drawing indicate the vertical distances between the vertical-reference line Cv and the object point P and the reflection reference point N, respectively. In other words, the distance Zn designates the depth of the reflection reference point N, and then the vertical direction distance between the object point P and the reflection reference point N is given as Z−Zn.

Light from an illuminant hits the surface of an object and is then reflected in a form dependent on the optical characteristics of the surface. The reflection seen by the camera 20, I(λ), is given by the following expression.

$$I(\lambda)=E(\lambda)\cdot\rho(\lambda) \tag{1}$$

Where E(λ) is the spectral power distribution of the illumination, ρ(λ) is the surface reflectance of the object, and λ is the wave length. The reflection I(λ) is then decomposed into three colors R, G, and B. The reflection surface 18 reflects the illumination at a horizontally reduced resolution, as compared with that of the direct image Im, and obtaining the indirect image In means a measure of the illumination in this way.

The specularly-reflected ray at the reflection surface 18 is surrounded by a distribution of diffuse rays. It affects the ray reaching the indirect image section Fn on the CCD device 23 by different weights. For example, in FIG. 2(a), the rays incident along the optical axes S1 and S2 have diffuse reflection intensity distributions approximated to the Gaussian distributions G1 and G2 having their respective peaks on the optical axes of specular reflections, S1 and S2. The ray on a particular optical axis Sn toward the CCD device 23 affects, with values of intensity of DRC1 and DRC2, the rays reaching the CCD device 23 as the indirect image section Fn. With this approximation, the ray C reflected from a point on the nose can be expressed as follows:

$$C(X,Y)=\int\int Eo(X,Y)\cdot\rho o(X,Y)\cdot B1(X,Y)dXdY \tag{2}$$

Where the letter "1" refers to a point on the object Ob. The ray C represents a weighted summation of all rays illumination point N on the nose surface from the scenery points. The weighting factor changes with the changing angle of incidence and the roughness of the nose surface. The blurring factor B1 depends on the optical characteristics and roughness of the reflection surface 18.

Figure 2A:
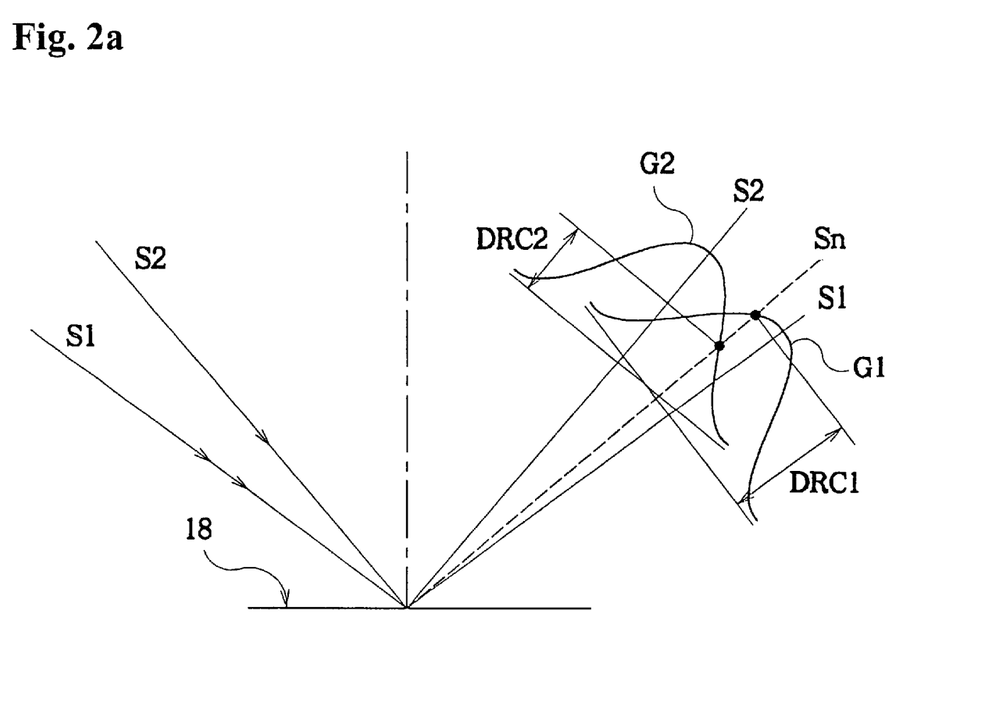
FIG. 2(a) is a diagram showing the first convolution on the reflection surface due to diffuse reflection pattern, and (b) is a diagram showing the second convolution on the CCD device due to defocusing on the indirect image section Fn.
Figure 2B:
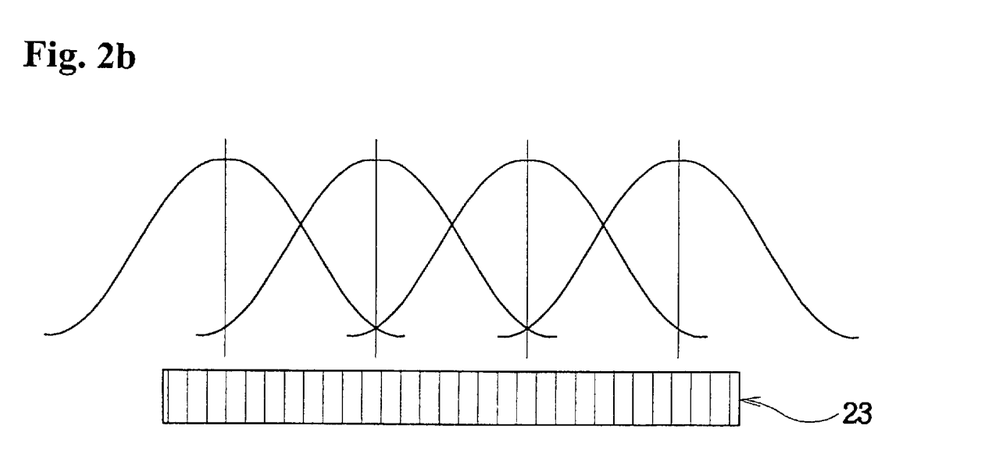

As the reflection surface 18 is seen out of the focus of the lens 21, every ray reflected from the reflection surface 18 will be projected as a circle. The intensity distribution is approximated to vary according to Gaussian function across the diameter of the blur circle as shown in FIG. 2(b). Thus every pixel in the indirect image section Fn of the CCD device 23 receives a weighted summation of a circular window. The size of this window depends on the blurring factor B2, which in turn depends on the focal length and the depth of the reflection reference point N from the lens 21 of the camera 20.

$$Cni = \int\int B2(Xni,Yni) \cdot C(Xni,Yni) dXni \cdot dYni \qquad (3)$$

Where the letter ni refers to pixel of the indirect image In and the sub-coordinates (Xni, Yni) refer to the coordinates of the indirect image on the CCD device 23.

Combining the two expressions containing the two kinds of blurring factors B1 and B2 results in two operations of spatial blurring. One is achieved on the reflection surface 18, and the other is achieved by defocusing on the CCD device 23 since the reflection surface 18 is imaged out of the focus of the lens 21. The blurring process is performed in two separately-controlled layers. We assume that the successive convolutions by combining the two expressions containing the two blurring factors represents the illumination color at the object point. That is to say, we consider that the indirect image section Fn obtained on the CCD device 23 by reflection on the reflection surface 18, represents the illumination color at the object point P or illumination in the vicinity thereof.

Accordingly, the color intensity signals D1, D2 and D3 obtained by calculation shown in the following expressions (4) represent corrected colors of the object point P on the object Ob. This is due to the fact that dividing Rmi, Gmi, Bmi at each main coordinate representing illumination color at the object point P times the color of the object point P itself by Rni, Gni, Bni at the sub-coordinates representing illumination color at the object point P removes the effects of illumination color at the object P.

$$D1\ (Xmi,Ymi) = (Rmi/Rni) \cdot S,$$

$$D2\ (Xmi,Ymi) = (Gmi/Gni) \cdot S,$$

$$D3\ (Xmi,Ymi) = (Bmi/Bni) \cdot S \qquad (4)$$

Where the letter m represents the direct image Im, n represents the indirect image In from the reflection surface 18, and i represents an image on the CCD device 23. The characters D1, D2 and D3 respectively represent R, G, and B components of the color-corrected image at the main coordinates (Xmi, Ymi), Rmi, Gmi, Bmi respectively represent R, G, B components in a direct image pixel (Pm) at the main coordinates (Xmi, Ymi), and Rni, Gni, Bni respectively represent R, G, B components in an indirect image pixel (Pn) at the sub-coordinates (Xni, Yni). The main coordinates (Xmi, Ymi) stand for coordinates of the direct image obtained when the object point P is focused on the imaging device 23 and the sub-coordinates (Xni, Yni) stand for coordinates of the indirect image of the object point P obtained by the reflection surface 18 on the imaging device 23. The factor S adjusts the absolute values so that the values D1 to D3 will not be saturated.

The role of the reflection surface 18 as a sensor for detecting spatial illumination can be confirmed by a simple experiment. When a strong spot light is directed to a white wall, the imaging system 1 of the invention takes the image shown in FIG. 3(c). The direct image Im of the spot appears as an image like a white circle on the left side of the boundary DL, and its indirect image In is projected at a reduced horizontal resolution as an ellipse with a surrounding flare. The reflection at the reflection surface 18 represents the illuminant color. The color of illumination can be changed by using color filters with an incandescent lamp.

The narrow band light was projected on a white wall, and the R, G and B values were measured for corresponding patches in the direct image Im and the indirect image In. The ratios of the color intensity signals (D1, D2, D3) were almost constant when the color of illumination was varied.

Next, the positional relation between the reflection surface 18 and the camera 20 will be described.

The reflection surface 18 and a horizontal line parallel to the vertical-reference line Cv forms an angle $\alpha$. The reflected ray from the reflection surface 18 represented by the line NO and the horizontal line forms an angle $\xi$, and the line NO and the reflection surface 18 forms an angle $\beta$. The line NO and a perpendicular line to the reflection surface 18 forms an angle $\theta$. Since the line NO indicates specular reflection of the line PN indicating the incident light at the reflection surface 18, the line PN and a perpendicular line to the reflection surface 18 also forms the angle $\theta$. The character f denotes the focal length of the lens 21 of the camera 20. The angle formed between the line PN and a horizontal line is designated as x, the object point horizontal location angle between the line PO and a horizontal line as $\phi$, and the viewing error angle between the line PO and the line PN as $\psi$.

For the object point P, $\psi = \phi - x$

For $\angle PNO, x + \xi = 2\theta$. $\qquad (5)$

For the vertically opposite angle about the reflection reference point N, $\alpha = \xi + \beta$ holds.

From the relation about the perpendicular line to the reflection surface 18 around the reflection reference point N, $\beta = \pi/2 - \theta$.

From the above two expressions around the reflection reference point N, $\xi = \alpha - \beta = \alpha + \theta - \pi/2$ holds, and further, $\theta = \xi - \alpha + \pi/2$ holds.

When the expressions above are rearranged, the following equation holds:

$$\psi = \phi - x = \phi - (2\theta - \xi) = \phi + \xi - 2\theta = \phi + \xi - 2(\xi - \alpha + \pi/2) = \phi + \xi - 2\xi + 2\alpha - \pi = \phi - \xi + 2\alpha - \pi \qquad (6)$$

The angle $\alpha$ of the reflection surface 18 can be calculated using the equation above. The object point horizontal location angle $\phi$ can be obtained using the equation below.

$$\phi = \tan^{-1}((Z-f)/x) \qquad (7)$$

The angle $\xi$ is an index indicating the horizontal direction coordinate of the reflection reference point N on the reflection surface 18 or the indirect image In, which can be obtained by $$\xi = \tan^{-1}(f/Xni) \qquad (8)$$

Figure 5A:
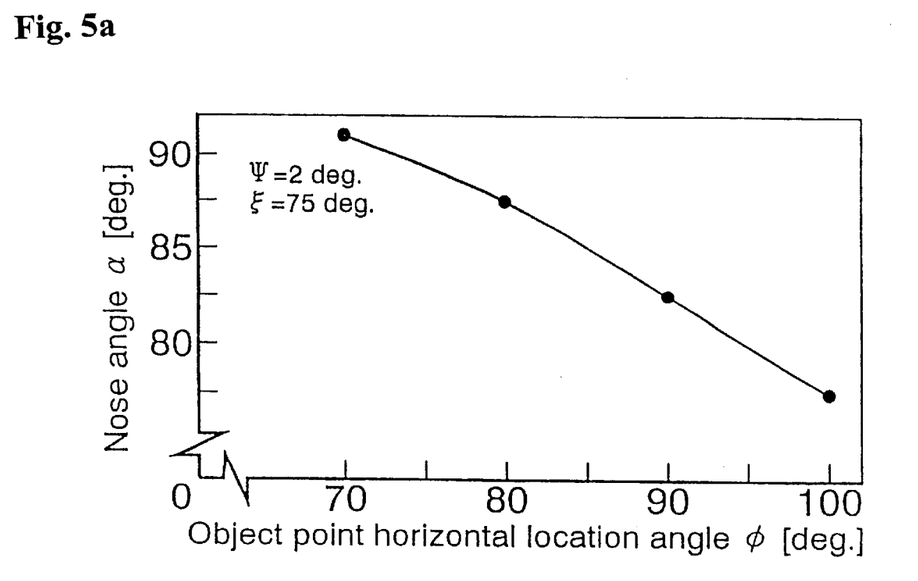
FIG. 5(a) is a graph showing the relation between varying horizontal location of the object point P and the optimum reflection surface angle α, and (b) is a graph showing the relation between the depth of the object point P and the viewing error angle ψ.

The optimum angle $\alpha$ of the reflection surface 18 with the changing horizontal coordinate of the object point P is shown in FIG. 5(a). The angle $\alpha$ was calculated by setting the viewing error angle $\psi$ to a small value of 2 degrees. Other angles were represented by their average magnitudes. In FIG. 5(a), the object point horizontal location angle $\phi$ is shown on the abscissa and the angle $\alpha$ of the reflection surface 18 is shown on the ordinate. It is preferred that the angle $\alpha$ of the reflection surface 18 be appropriately decreased when the object point horizontal location angle $\phi$ increases, so as to keep the viewing error angle $\psi$ to a small and almost constant value.

Figure 3A:
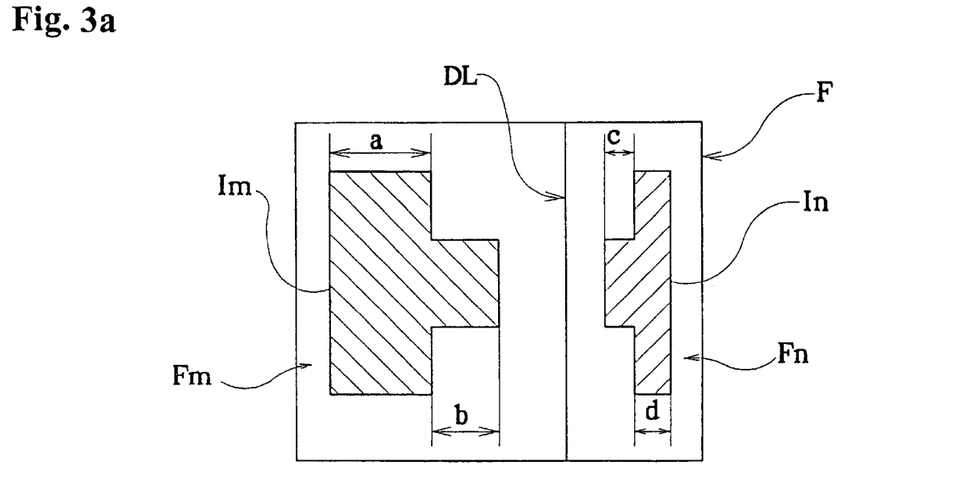
Figure 3B:
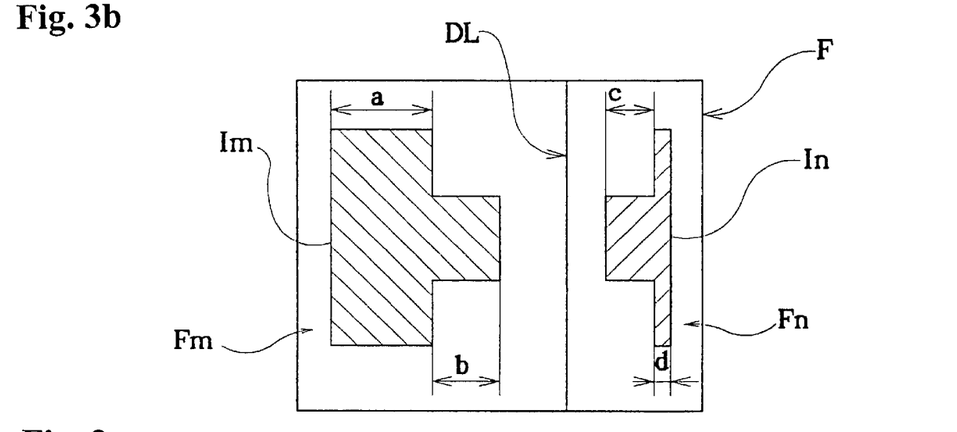
Figure 3C:
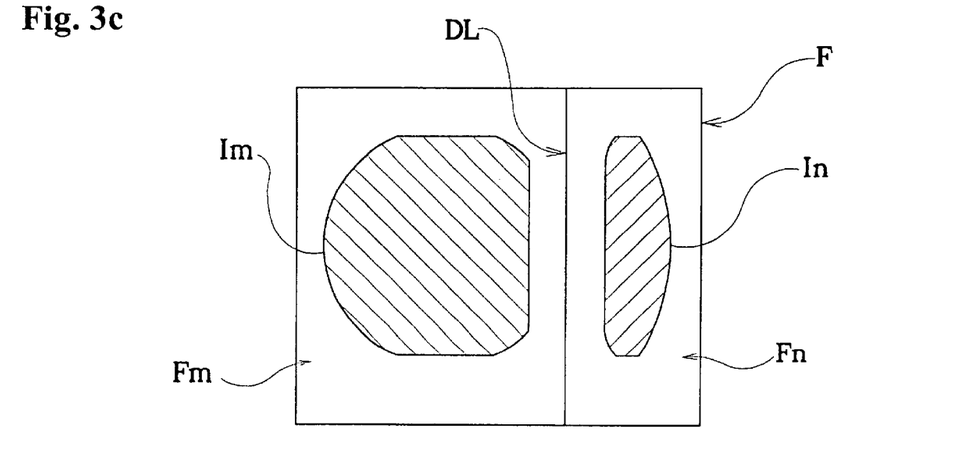
Figure 4A:
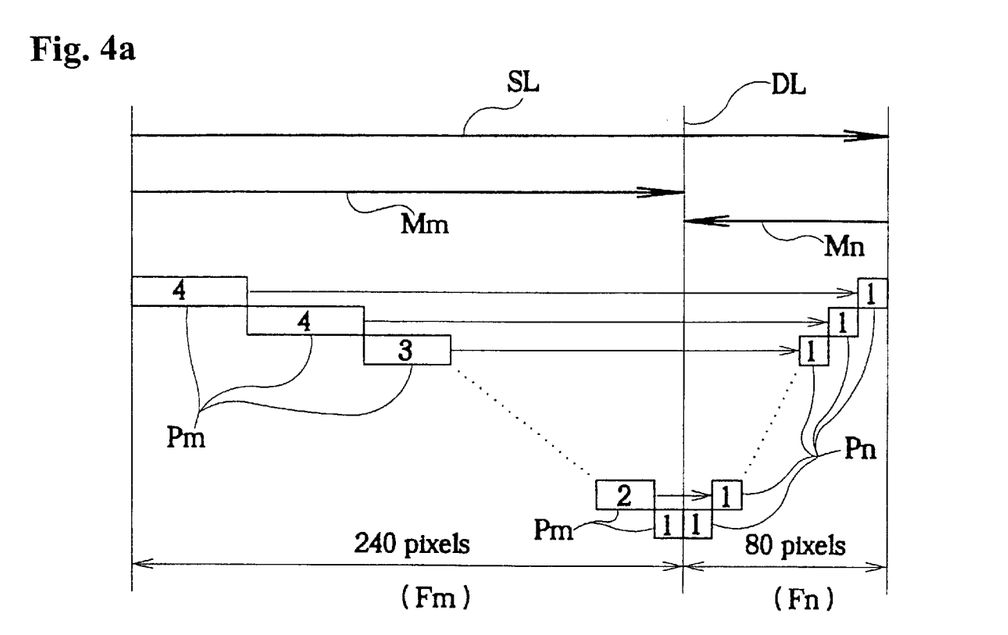
Figure 4B:
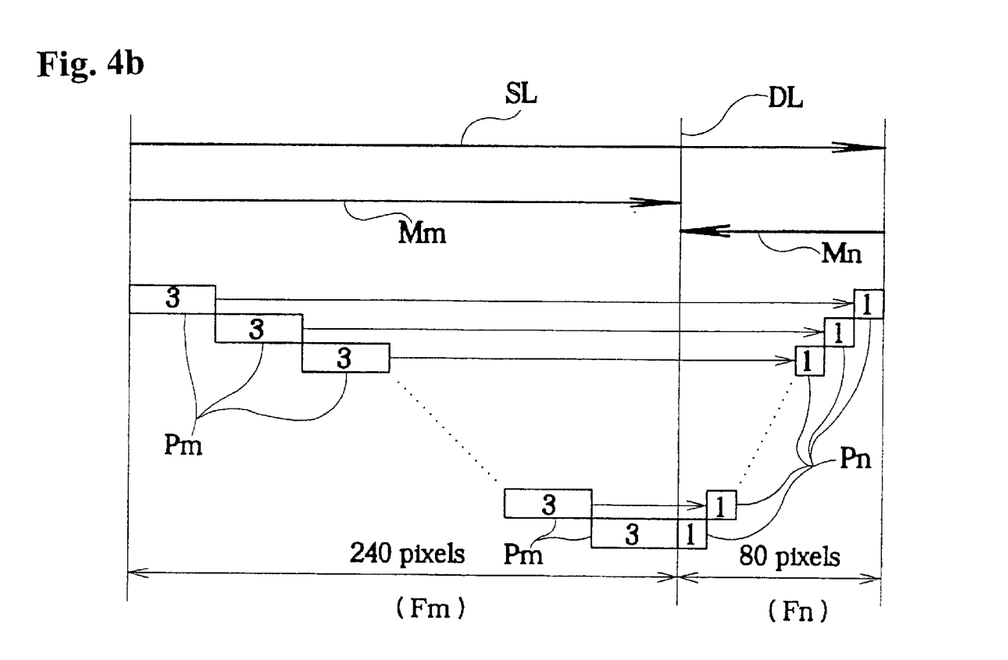

As shown in FIGS. 1, 3 and 4, each image line consists of the direct image section Fm for taking the direct image Im and the indirect image section Fn separated by the boundary DL for taking the indirect image In. The boundary DL separating the direct image section Fm and the indirect image section Fn corresponds to the reflection surface top 18a of the reflection surface 18. Mapping in this invention is defined as assigning indirect image pixels Pn forming the indirect image section Fm to direct image pixel groups Pm in the direct image section Fm. Mapping becomes difficult when the object Ob is located near the camera 20, for the angle $\psi$ is a measure of the viewing error. The angle $\psi$ is required to be as small as possible to minimize the view difference between the direct image Im and the indirect image In. When the angle $\psi$ is large, the object Ob will be seen in the direct image section Fm, but not be visible in the indirect image section Fn, or vice versa. The angle $\psi$ can be expressed in terms of coordinates of the reflection surface 18. Referring to the geometry of FIG. 1, the following expression can be derived.

$$\tan(x) = (Z-Zn)/(Xn-X) \tag{9}$$

Obtaining tangents on both sides in Eq.(5) provides the following equation.

$$\tan\psi = (\tan\phi - \tan(x))/(1 + \tan\phi \cdot \tan(x)) \tag{10}$$

From Eqs.(9) and (10) above, the following equation can be obtained.

$$\tan\psi = (Xn(Z-f) + Zn \cdot X + X \cdot f - 2X \cdot Z)/(Xn \cdot X + Zn(f-Z) + Z(Z-f) - X^2) \tag{11}$$

Eq.(11) represents the dependency of the angle on both of the object point P (X, Z) and the reflection reference point N (Xn, Zn) on the reflection surface 18. When X is set to be equal to zero in Eq.(11), the value of tangent angle at the camera optical axis points can be obtained as shown by Eq.(12) below.

$$\tan\psi = (Xn(Z-f))/(Zn(f-Z) + Z(Z-f)) \tag{12}$$

An increase in the reference point horizontal distance Xn, or the horizontal distance between the reflection reference point N and the horizontal-reference line Ch, will result in a subsequent increase in the viewing error $\psi$. Therefore it is preferable to place the reflection surface 18 as horizontally close to the horizontal-reference line Ch as possible. The error angle $\psi$ increases with an increase in the depth Zn of the reflection reference point N. Thus the depth Zn of the reflection reference point N from the lens 21 of the camera 20 should be as small as possible.

Figure 5B:
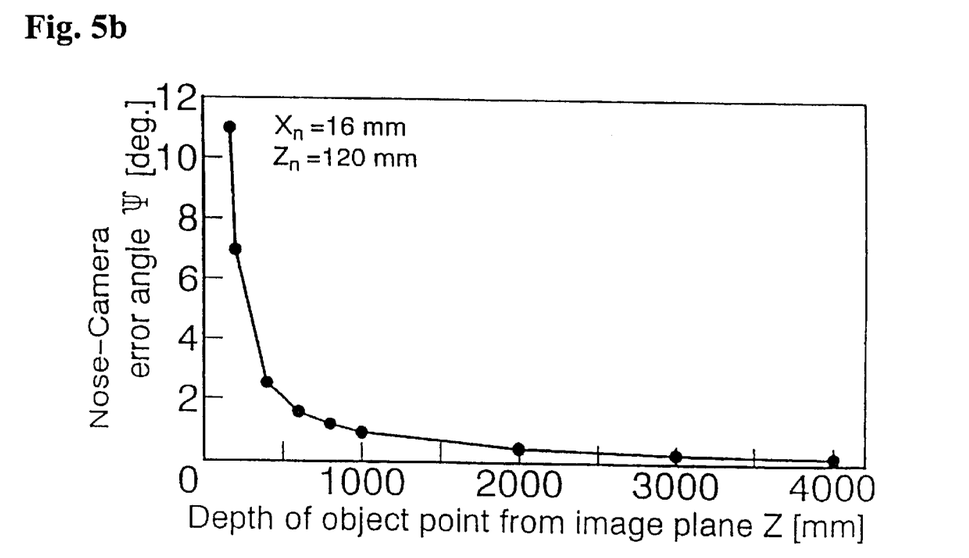

FIG. 5(b) shows the dependence of the viewing error angle on the object distance Z. An increase in the distance Z decreases the viewing error angle $\psi$. The error angle $\psi$ will be at considerable values for objects Ob placed near, but it is less than 2 degrees at distances of 40 cm or longer. The viewing problem is not serious unless the lighting is made in stripes with fine resolution. For normal lighting conditions, the illuminance does not exhibit high frequency changes. The error angle $\psi$ increases as the reference point horizontal distance Xn from the reflection reference point N increases. This effect is minimized if the angle $\alpha$ of the reflection surface 18 changes according to the trend shown in FIG. 5(a).

From Eqs.(5) and (6) above, $x = \phi - \psi = \pi + \xi - 2\alpha$, and further, obtaining tangents of these equations provides the following equation.

$$\tan(x) = \tan(\pi + \xi - 2\alpha) = \tan(\xi - 2\alpha) \tag{13}$$

When Eqs.(7) and (8) are substituted in the equation above, the following equation is obtained.

$$(Z-Zn)/(X-Xn) = ((f - Xni \cdot \tan(2\alpha))/(Xni + f \tan(2\alpha)) \tag{14}$$

With (X/Z)=A, Eq.(14) above can be expanded and rearranged to present the following equation.

$$Xni/f = ((A - \tan(2\alpha)) - (Xn/Z - (Zn/Z) \cdot \tan(2\alpha)))/((1 + A \cdot \tan(2\alpha)) - ((Xn/Z) \cdot \tan(2\alpha) + Zn/Z)) \tag{15}$$

Further, when Z>>Zn, and X>>Xn, the latter terms in the numerator and denominator are then equal to zero, and the following equation holds.

$$Xni = f(A - \tan(2\alpha))/(1 + A \cdot \tan(2\alpha)) \tag{16}$$

This equation describes the mapping on the horizontal coordinate between the direct image Im and the indirect image In of the object Ob in the same scan line SL. Xni designating the coordinate of a point on the indirect image section Fn corresponding to one object point P on the object Ob does not clearly depend on the value of the distance, but rather depends on the ratio A=(X/Z). This can be explained by considering the omission of Zn in the equation. When it is assumed that the object Ob is sufficiently distant from the position of the camera 20, then the angle $\psi$ will be very small. In this case, if the object point P moves along OP, the reflection at the reflection surface 18 on the segment PN slightly changes. As shown by Eq.(16), the mapping is directly related to the determination of the profile of the reflection surface 18.

FIGS. 3(a) and 4(a) show a method of nonlinear mapping, and FIGS. 3(b) and 4(b) show a method of linear mapping. The mapping can be selected between the nonlinear and linear relations by defining Xni, A=(X/Z) and the angle $\alpha$ of each small part of the reflection surface in Eq.(16) in the positional relation between the direct image section Fm and the indirect image section Fn. FIG. 4 shows the correspondence between a direct image pixel group Pm on the direct image section Fm and an indirect image pixel Pn on the indirect image section Fn on one scan line SL, where the arrows show the direct image pixel groups Pm and the indirect image pixels Pn which correspond to each other when they are obliquely shifted. While the direction of mapping in the direct image section Fm is directed as shown by the arrow Mm, the mapping direction in the indirect image section Fn is directed as shown by the reversely-directed arrow Mn. Usually, the boundary DL between the direct image section Fm and the indirect image section Fn is perpendicular to the lower edge of the total image plane F.

In the nonlinear mapping shown in FIGS. 3(a) and 4(a), the indirect image pixels Pn are assigned to corresponding direct image pixel groups Pm composed of different numbers of pixels. In this mapping, the dimensions of the corresponding portions in the direct image Im and the indirect image In are assigned so that a/d=b/c. That is to say, they are so assigned that the direct image Im and the indirect image In of the object Ob are similar figures with respect to the direction in which the direct image section Fm and the indirect image section Fn are arranged. This mapping is suitable for precisely color-correcting small parts in an image, e.g., when taking pictures of small objects like flowers.

In the linear mapping shown in FIGS. 3(b) and 4(b), they are so assigned that the ratio of the numbers of corresponding pixels between the indirect image section Fn and the direct image section Fm, (Pm/Pn), is constant in the direction in which the direct image section Fm and the indirect image section Fn are arranged. In this mapping, the dimensions of corresponding parts in the direct image Im and the indirect image In are so assigned that a/d and b/c are not uniform. That is to say, the direct image Im and the indirect image In cannot be similar, and the parts in the direct image section Fm are color-corrected at uniform resolution. This mapping enables high speed image processing, which provides color-corrected image almost on a real-time basis. The assigning means for performing the assignment can be implemented by using a personal computer 30, as will be described later.

The entirety of the reflection surface 18 is not linear as shown in FIG. 1, but individual small parts have different surface angles α, the entirety of which is formed in a curved shape. The reflection surface 18 is drawn in a linear shape in FIG. 1 only for convenience in description.

When graphically designing the reflection surface 18, first, the angle α of a small part on the reflection surface at the reflection surface top 18*a* is determined such that the visible image vertical extreme lines can be projected on the indirect image section Fn on the right side of the boundary DL on the CCD device. The angle α of each small part on the reflection surface was determined on the basis of the requirement shown in FIG. 5(*a*). The Length projected from a direct image and the corresponding length of small part on the reflection surface 18 were graphically measured at a depth of one meter. In this case, the difference in depth did not cause considerable errors as estimated numerically from Eq.(16). That is to say, it can be said that a mapping equation is fitted to the graphical measurements of pixels between the direct image section Fm and the indirect image section Fn.

When numerically designing the reflection surface 18, first, the coordinates of the reflection surface top 18*a*, (Xo, Zo), are obtained from the boundary of the light reaching the camera 20. When using the linear mapping, the above-described A=(X/Z) and M=(Xni/f) are obtained from the correspondence between the indirect image section Fn and the direct image section Fm, and the angle a of the small part of the reflection surface at that coordinates is determined by using Eq.(16). Next, by using the following equations (17) and (18), coordinates of a part separated from the coordinates (Xo, Zo) by a small distance are obtained. The characters "n" and "n−1" in the following two equations indicate relation between an (n−1)th small part closer to the reflection surface top 18*a*, when the reflection surface 18 is divided into small parts, and an nth small part location on the side closer to the reflection surface end 18*b* away from the top. Further, the angle α at the newly obtained coordinates (Xn, Zn) is obtained from Eq.(16) above. This process is sequentially repeated to determine the curved plane of the reflection surface 18.

$$Z_n=(Z_{n-1}-\tan\alpha_{n-1}(M_n f_n-X_{n-1}))/(1-M_n\cdot\tan(\alpha_{n-1})) \quad (17)$$

$$X_n=X_{n-1}+(Z_{n-1}-Z_n)/\tan\alpha_{n-1} \quad (18)$$

Next, a structure of an imaging system according to the present invention will be described referring to FIGS. 1, 3, 4, 7 and 8.

Figure 7A:
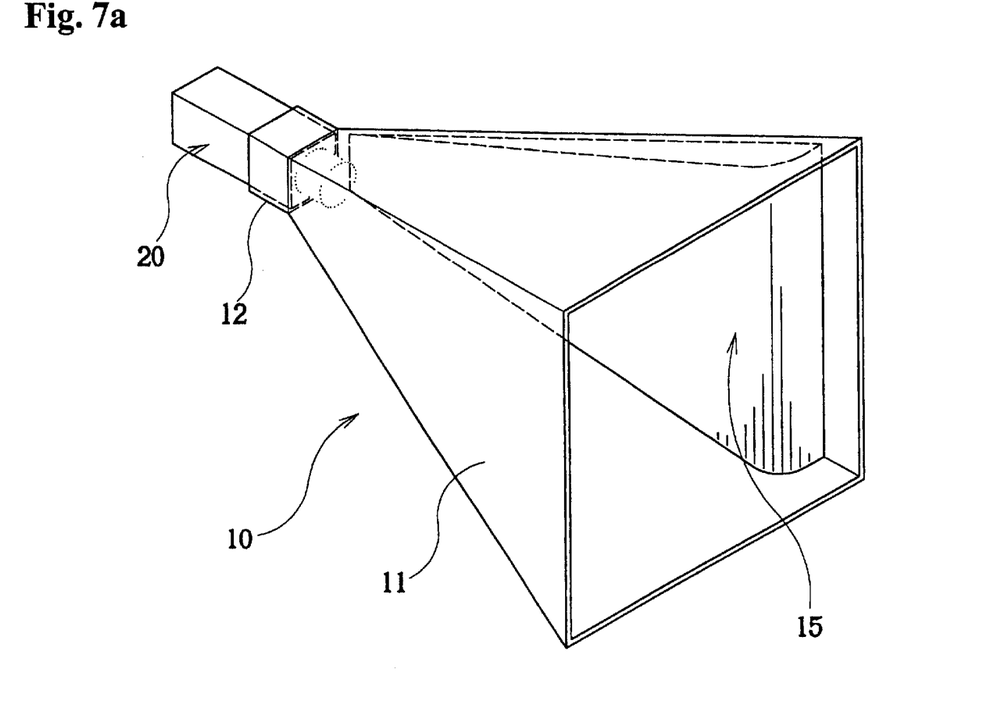
FIG. 7(a) is a perspective view of a camera fitted with a guard cover, and (b) is a transverse sectional view showing the guard cover.
Figure 7B:
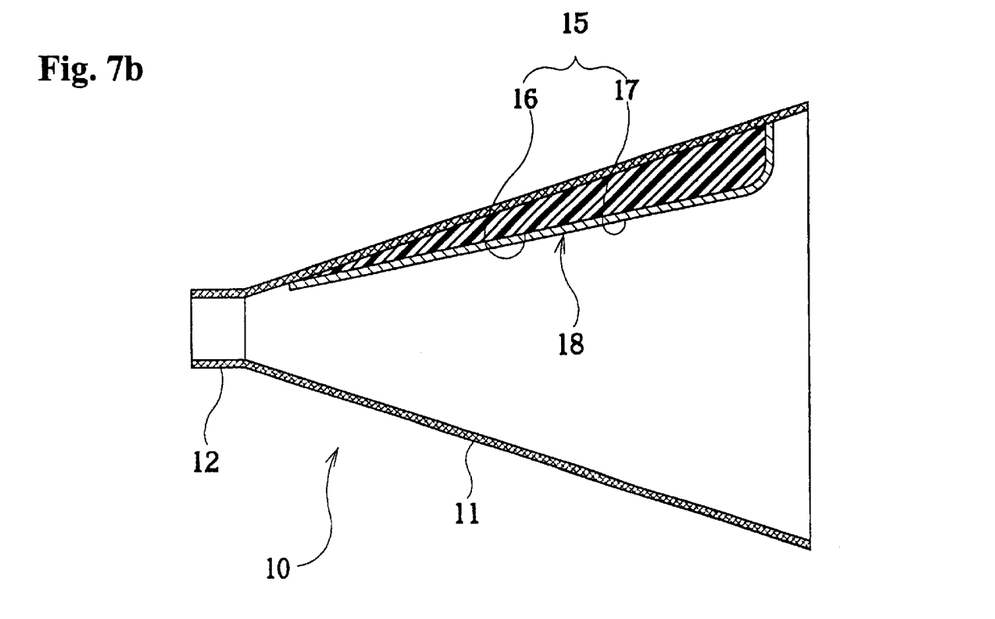

FIG. 7 shows a special structure around the camera 20, where a guard cover 10 having a reflector 15 is attached to the front side of the camera 20. The guard cover 10 has a body 11 shaped in a prismoid and a fitting part 12 to be fitted on the camera 20. The body 11 of the guard cover 10 prevents invasion of light into the camera 20 from outside of the range surrounded by the pair of maximum field lines (planes) Vm, Vm shown in FIG. 1. Intercepting the light from outside of the range surrounded by the pair of maximum field lines Vm, Vm is desired because it gives error to the light from the reflection surface 18 for correcting the image.

The reflector 15 is attached on one of the inner sides of the body 11, which comprises a base 16 for defining the surface shape of the reflection surface 18 and a skin 17 stuck on the surface of the base 16. The surface of the skin 17 on the reflection surface 18 side is matte and black- or gray-colored to diffuse-reflect light, on which oil is applied to form film.

Figure 8:
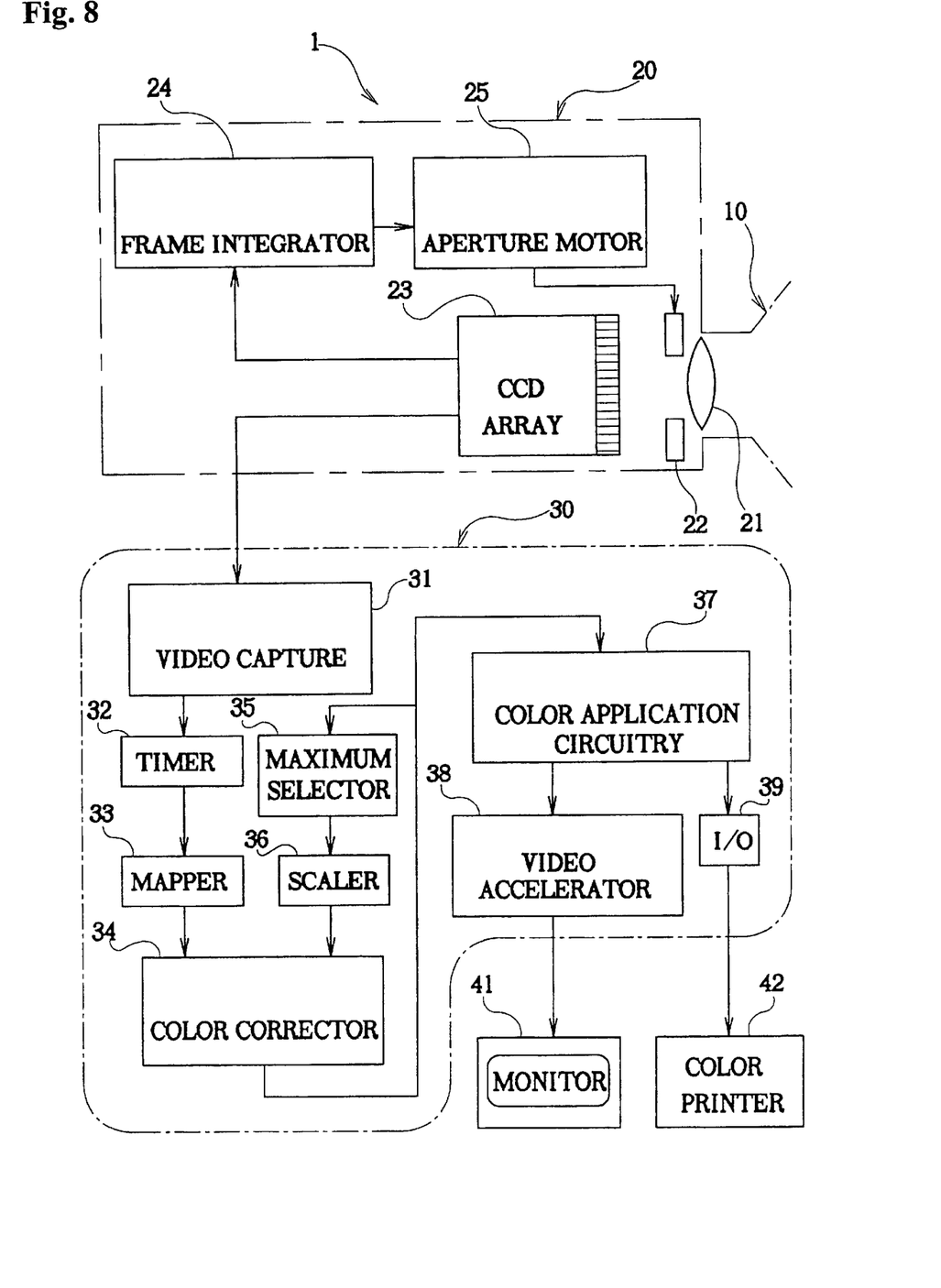
FIG. 8 is a logical block diagram showing an imaging system according to the present invention.
Figure 9:
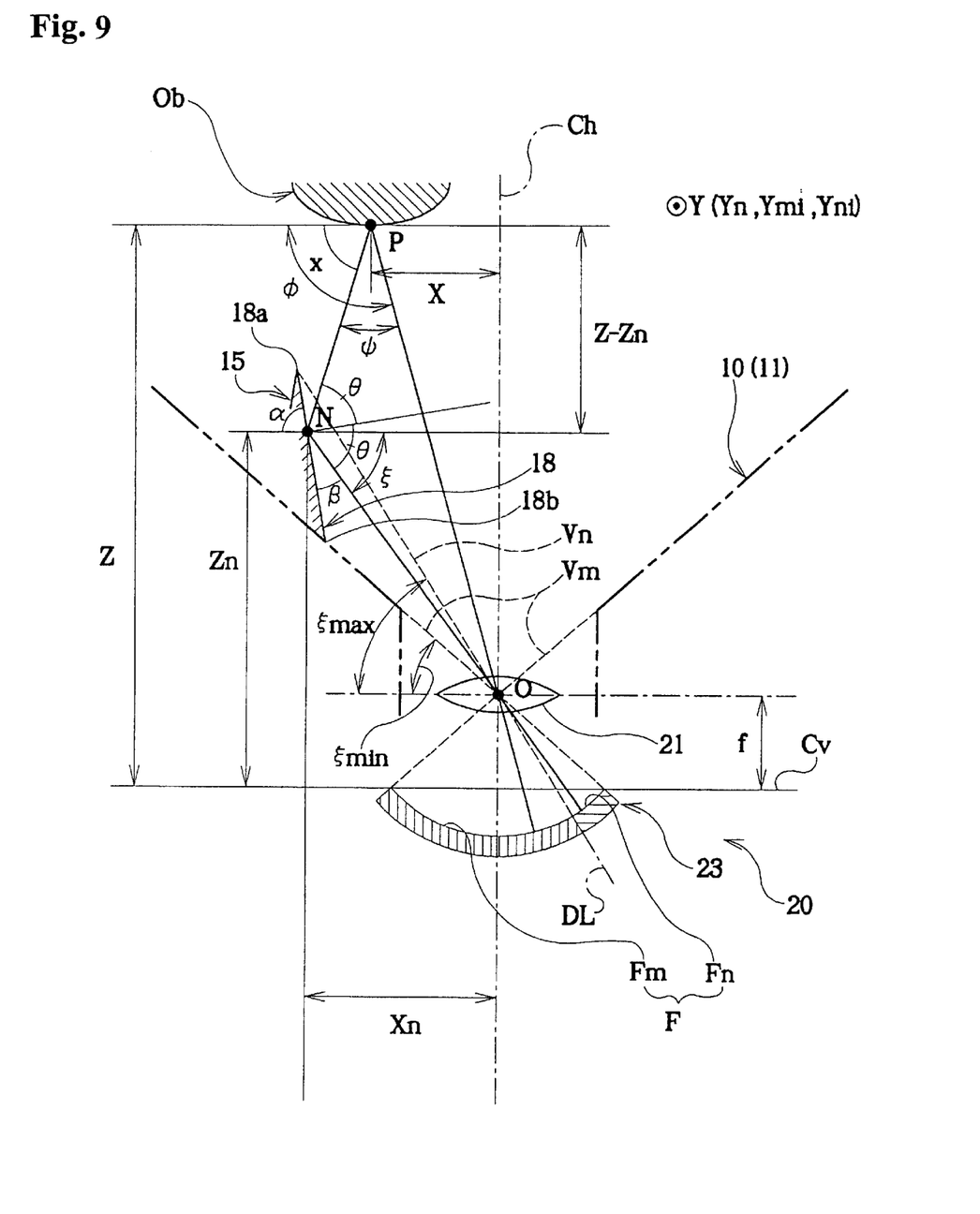
FIG. 9 is a diagram showing another embodiment of the present invention, which corresponds to FIG. 1.

FIG. 8 is a logical block diagram showing the imaging system 1; the imaging system 1 includes, as main members, the guard cover 10, camera 20, personal computer 30, monitor device 41, and color printer 42. The image captured through the lens 21 of the camera 20 is formed on the CCD device 23 with its quantity of light adjusted through the diaphragm 22. The output from the CCD device 23 is captured into the video capture 31 in the personal computer 30 and is also given to the frame integrator 24, which obtains the quantity of light of the taken image to control the quantity of aperture of the diaphragm 22 with the aperture motor 25 so that the output of the CCD device 23 will not be saturated.

The personal computer 30 is a common product, which is constructed by installing software in storage means like a hard disk, RAM, etc. to implement various functions of the timer 32, color application circuitry 37, etc. described later. This software can be distributed in a form stored in a storage medium such as a CD-ROM, flexible disk, etc. The video capture 31 digitizes the image sequentially scanned along the scan lines SL in the camera 20 and stores the data into a memory. The timer 32 functions as trigger for determining the position of the boundary DL for separating the direct image section Fm and the indirect image section Fn in the total image stored in the memory. In this embodiment, the direct image section Fm in the total image contains 240 pixels and the indirect image section Fn contains 80 pixels. The mapper 33 maps individual indirect image pixels Pn contained in the indirect image section Fn, 80 per one scan, to corresponding direct image pixel groups Pm in the direct image section Fm. This mapping is performed in a nonlinear or linear manner according to Eq.(16) as explained above.

The color corrector 34 obtains D1, D2, and D3 according to Eq.(4) and the maximum selector 35 obtains the maximums value of these values in the full image. The level at which the maximums value is not saturated corresponds to the appropriate value of the correction term S as the factor in Eq.(4), and the scaler 36 determines the appropriate value of the correction term S in the color corrector 34, and the values of the outputs D1, D2 and D3 are corrected. For example, with an 8-bit computer, the scale width in information processing is 256 and a scale width of about 85 is assigned to each of R, G, B, and therefore the correction term S is set so that the maximum value of the scale width for D1, D2, and D3 is 85 or smaller. Larger scale widths can be assigned with 16- or 32-bit computers, so as to represent colors at finer tones.

The color application circuitry 37 serves as means for storing, reproducing, editing, etc. the color-corrected image, which is implemented by driving software stored in a hard disk or the like by a CPU or other hardware. The image reproduced by the color application circuitry 37 is displayed as color moving picture, for example, in the monitor device 41 through the video accelerator 38, and is also printed in colors as still picture through the I/O port 39 and the color printer 42.

To verify the invention, a SONY XC-711 (trademark) color video camera was used as the camera 20 and a 12.5 mm focal length COSMICAR C-mount lens (trademark) was used as the lens 21. The color parameters were measured using a MINOLTA chroma meter module CS-100

(trademark). The prototype configuration of the imaging system 1 was used to obtain still images to obtain experimental data. While the skin 17 was made of gray matte paper to cause diffusion reflection, the use of leather having a coat of oil provided better results. The width ratio of the indirect image section Fn to the total image plane F was limited to a maximum of 25%. The processing time on the personal computer 30 using Pentium (trademark) with 120 MHz operation clock was 0.55 second for a 320×220 pixel image.

The applicability of the imaging system 1 which corrects surface color can be confirmed by studying the effects of illumination intensity on color quality. The inventor carried out experiments with some pieces of full color images subject to combined daylight and fluorescent illumination. The images were processed by dividing the colors on the direct image Im by colors on the indirect image In. The image colors were improved, and dark images got brighter with observable details while strong illumination pictures got darker. Dark images below 100 lx were noisy even after processed by the method using the reflection surface 18.

Figure 6A:
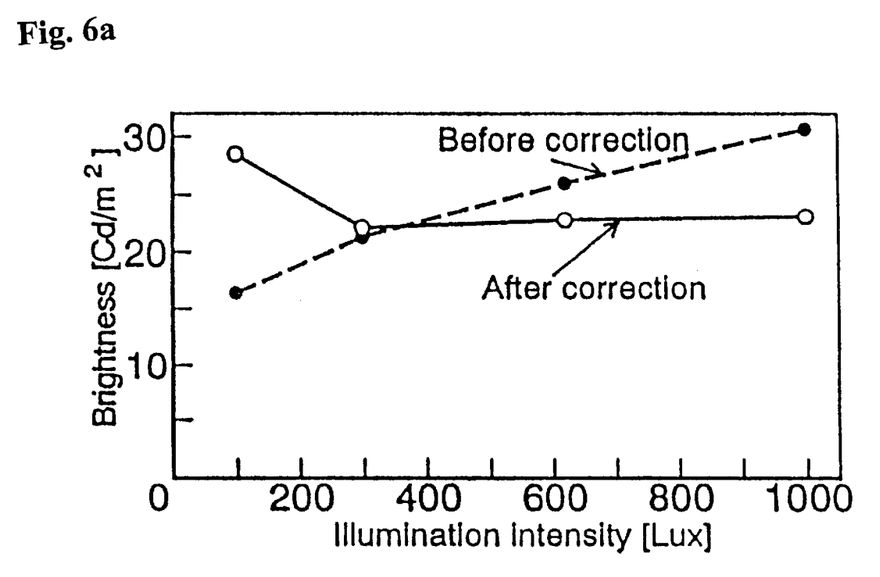
FIG. 6(a) is a graph showing changes before and after color correction in the relation between the illumination intensity and brightness, and (b) is a graph showing changes before and after color correction in the relation between the illumination intensity and x-chromaticity coordinate.
Figure 6B:
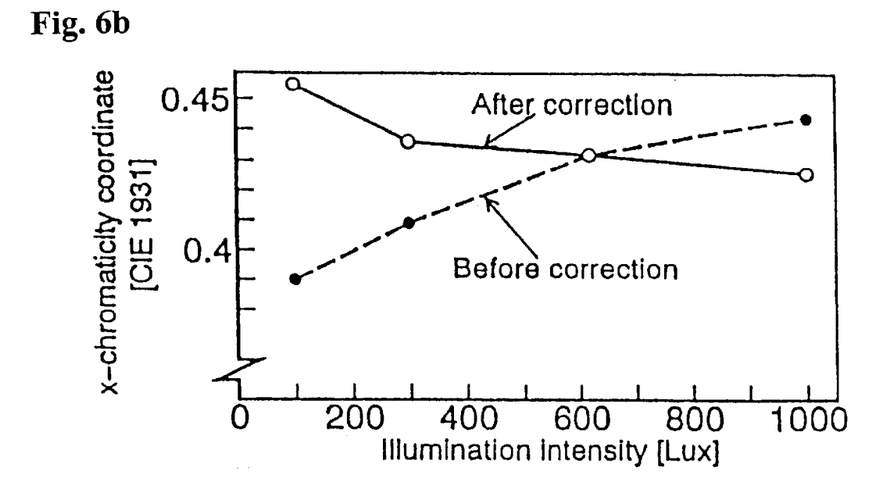

A separate experiment was carried out to detect the quantitative quality of color correction provided by this imaging system 1. A red color patch was set on a camera plane and the color of the patch was compared at different illumination intensities. The effect of lighting intensity on the brightness of the red color patch before and after correction is shown in FIG. 6(a). The abscissa shows the illumination intensity and the ordinate shows the brightness of the red color patch. As shown in the curve "Before correction", an increase in scene illumination intensity usually results in an increase in brightness of the color patch in the image. As shown in the curve "After correction", the brightness of the patch after correction is almost constant and stable even when the illumination intensity is changed. The effect of illumination intensity on the x- and y-chromaticity coordinates based on CIE 1931 standard is shown in FIG. 6(b). As shown in the curve "Before correction" in FIG. 6(b), the x-chromaticity coordinate of the red color patch shown on the ordinate increases as the illumination intensity shown on the abscissa increases. This implies a hue distortion of the original color at different lighting intensities. The x-chromaticity coordinate in the corrected images decreases slightly as the illumination intensity increases. While, as shown in FIGS. 6(a) and (b), the values of brightness and x-chromaticity coordinate at 100 lx corresponding to the lowest illumination intensity are always different from those at larger intensity points, it is possible to maintain the constancy of illuminance and hue at lower illumination intensities by changing the conditions for setting the reflection surface.

The correction to image colors by the imaging system 1 using the reflection surface 18 eliminated distorted original colors of images. The corrected color histograms of one image under different light intensities were all similar. This shows that the lighting intensity has no global effect. As shown in FIGS. 6(a) and (b), the color parameters before and after color correction show that the color brightness and hue vary only slightly when the illumination intensity varies in a certain range.

Finally, other possible embodiments of the invention will be described.

Although the total image plane F in the CCD device 23 is plane-shaped in the above-described embodiment, it is logically possible to use a CCD device 23 having its total image plane F shaped in a curved surface around the point O in the lens 21, for example. In this case, Eq.(15) shown above can be replaced by the equation below.

$$\tan(b\ 2\alpha) = (A \cdot \tan\xi + 1 - ((Zn/Z) + (Xn/Z) \cdot \tan\xi))/(1 - A \cdot \tan\xi + ((Zn/Z) \cdot \tan\xi - (Xn/Z))) \quad (19)$$

Further, when Z>>Zn, and X>>Xn, the latter terms in the numerator and denominator in the equation above are then equal to zero and the following equation for replacing Eq.(16) holds.

$$\tan(2\alpha) = (A \cdot \tan\xi + 1)/(1 - A \cdot \tan\xi) \quad (20)$$

The curved surface of the reflection surface 18 can be designed on the basis of this equation (20) in place of the equation (16) shown before.

Although the reflection surface 18 is made of black leather having oil coating thereon in the above-described embodiment, the reflection surface may be made of other material having matte gray surface, for example, as long as it causes diffuse reflection of light at appropriate intensity.

In the embodiment above, in mapping, one indirect image pixel Pn is assigned to a direct image pixel group Pm composed of a plurality of direct image pixels to show a practical example. However, one indirect image pixel Pn may be assigned to one direct image pixel Pm when the indirect image section Fn and the direct image section Fm have equal width, and, it is also logically possible to assign an indirect image pixel group Pn composed of a plurality of indirect image pixels to one direct image pixel Pm when the indirect image section Fn has larger width than the direct image section Fm.

INDUSTRIAL APPLICABILITY

The above-described imaging system (apparatus) can be applied to video cameras for taking moving pictures, digital cameras for taking still pictures, etc. The imaging system can also be preferably applied to stereo range finders on a color basis. Current stereo range finders are designed to detect characteristic points on every scan line on the basis of change of color code. The characteristic points are compared between the right and left stereo images, and the correspondence is determined when the color codes are similar. Stabilization of the color codes is a major advantage of the color constancy of the present invention, and application of this imaging system to the stereo range finders enhances the stereo matching reliability.

What is claimed is:

1. A camera comprising an imaging device for taking a color image and a lens for forming an image of an object (Ob) on said imaging device, the imaging system comprising a reflection surface provided within a maximum field of view (Vm, Vm) formed by said lens and said imaging device, for diffuse-reflecting the image of said object (Ob) to cause the image to impinge upon said imaging device through said lens said imaging device having a direct image section (Fm) for forming a direct image imaged as an object point (P) on said object (Ob) and an indirect image section (Fn) for forming an indirect image of said object point (P) obtained from said reflection surface.

2. The camera according to claim 1, wherein said reflection surface is so set that a direct image section (Fm) for forming said direct image in said imaging device has a larger width than an indirect image section (Fn) for forming said indirect image.

3. The camera according to claim 1, further comprising a cover provided on the side on which light comes into said lens and said reflection surface arranged inside the cover.

4. The camera according to claim 1, wherein the direct image (Im) and the indirect image (In) of said object (Ob) are similar figures with respect to the direction in which a direct image section (Fm) for forming said direct image and an indirect image section (Fn) for forming said indirect image are arranged.

5. The camera according to claim 1, wherein the ratio of the numbers of corresponding pixels (Pm/Pn) between an indirect image section (Fn) for forming said indirect image and a direct image section (Fm) for forming said direct image is constant in the direction in which said direct image section (Fm) and said indirect image section (Fn) are arranged.

6. The camera according to claim 1, wherein said reflection surface is shaped according to the following equation:

$$Xni=f(A-\tan(2\alpha))/(1+A\cdot\tan(2\alpha))$$

wherein f represents focal length of the lens, A represents (X/Z), X represents horizontal-direction distance of the object point (P) from a horizontal-reference line (Ch), Z represents vertical distance of the object point (P) from a vertical-reference line (Cv), and α represents an angle formed between the reflection surface and a horizontal line parallel to the vertical-reference line (Cv).

7. The camera according to claim 1, wherein said reflection surface is leather having oil coating on its surface.

8. The imaging system of the camera according to claim 1, further comprising a video capture digitizing the image sequentially scanned along the scan lines (SL) in said camera and stores the data into a memory, the image having said direct image section (Fm) and said indirect image section (Fn).

9. The imaging system of the camera according to claim 1, wherein the images were processed by dividing the colors on the direct image (Im) by colors on the indirect image (In) in each color.

10. The imaging system according to claim 9, wherein the results by said dividing were multiplied with a common correction term (S) in three colors.

11. The imaging system of the camera according to claim 1, further comprising assigning means for assigning each main coordinates (Xmi, Ymi) in said direct image obtained as an object point (P) on said object (Ob) is imaged on said imaging device to corresponding sub-coordinates (Xni, Yni) in said indirect image of said object point (P) obtained from said reflection surface on said imaging device, and a color-correcting portion for obtaining an image color-corrected on the basis of the following expressions:

$$D1\ (Xmi, Ymi)=(Rmi/Rni)\cdot S,$$

$$D2\ (Xmi, Ymi)=(Gmi/Gni)\cdot S,$$

and $$D3\ (Xmi, Ymi)=(Bmi/Bni)\cdot S$$

wherein D1, D2, and D3 respectively represent R, G, B components of the color-corrected image at said main coordinates (Xmi, Ymi), Rmi, Gmi, and Bmi respectively represent R, G, B components in a direct image pixel (Pm) at said main coordinates (Xmi, Ymi), Rni, Gni, and Bni respectively represent R, G, B components in an indirect image pixel (Pn) at said sub-coordinates (Xni, Yni), and S represents a correction term.

12. The imaging system according to claim 11, wherein the ratio of the numbers of corresponding pixels (Pm/Pn) between an indirect image section (Fn) for forming said indirect image and a direct image section (Fm) for forming said direct image is constant in the direction in which said direct image section (Fm) and said indirect image section (Fn) are arranged.

13. An imaging system of the camera according to claim 1, wherein said reflection surface is shaped according to the following equation:

$$Xni=f(A-\tan(2\alpha))/(1+A\cdot\tan(2\alpha))$$

wherein f represents focal length of the lens, A represents (X/Z), X represents horizontal-direction distance of the object point (P) from a horizontal-reference line (Ch), Z represents vertical distance of the object point (P) from a vertical-reference line (Cv), and α represents an angle formed between the reflection surface and a horizontal line parallel to the vertical-refer line (Cv).

14. The imaging system of the camera according to claim 1, wherein the colors of the image were corrected by comparing the direct image (Im) and the indirect image (In).

* * * * *